(12) United States Patent
Harland et al.

(10) Patent No.: US 8,916,029 B2
(45) Date of Patent: Dec. 23, 2014

(54) CONTAMINATED SOLVENT RECYCLING SYSTEM

(75) Inventors: Charles Harland, Embrum (CA); Dennis William Mount, Ottawa (CA); Mathieu Fredette, Gloucester (CA)

(73) Assignee: ChemChamp, LLC, Ottawa, ON (CA)

( * ) Notice: Subject to any disclaimer, the term of this patent is extended or adjusted under 35 U.S.C. 154(b) by 1985 days.

(21) Appl. No.: 10/537,316

(22) PCT Filed: Dec. 3, 2003

(86) PCT No.: PCT/CA03/02032
§ 371 (c)(1),
(2), (4) Date: Mar. 31, 2008

(87) PCT Pub. No.: WO2004/050206
PCT Pub. Date: Jun. 17, 2004

(65) Prior Publication Data
US 2009/0114521 A1    May 7, 2009

(30) Foreign Application Priority Data
Dec. 3, 2002  (CA) ..................................... 2413438

(51) Int. Cl.
*B01D 3/10* (2006.01)
*B01D 3/42* (2006.01)
*B01D 3/00* (2006.01)
*B01D 1/00* (2006.01)
*B01D 5/00* (2006.01)

(52) U.S. Cl.
CPC ................ *B01D 3/00* (2013.01); *B01D 1/0052* (2013.01); *B01D 3/10* (2013.01); *B01D 3/42* (2013.01); *B01D 5/00* (2013.01); *Y10S 159/901* (2013.01); *Y10S 159/16* (2013.01); *Y10S 159/23* (2013.01)

USPC ........... 202/170; 137/512; 137/557; 137/636; 159/44; 159/901; 159/DIG. 16; 159/DIG. 23; 202/160; 202/205

(58) Field of Classification Search
USPC ...... 159/44, 901, DIG. 16, DIG. 23; 202/160, 202/170, 185.1, 205, 258, 260; 137/511, 137/512, 557, 636; 203/2, 94, 98, 100, 203/DIG. 18
See application file for complete search history.

(56) References Cited

U.S. PATENT DOCUMENTS 3,772,082 A * 11/1973 Dunn, Jr. ........................ 134/10
4,139,418 A *  2/1979 Sech ............................. 202/181
(Continued)

FOREIGN PATENT DOCUMENTS

WO       WO 01/03810 A3      1/2001

OTHER PUBLICATIONS

EP Communication Pursuant to Article 94(3) EPC in Appl. No. 030 782 044.8, May 23, 2008, ChemChamp (Barbados) Inc.

*Primary Examiner* — Virginia Manoharan
(74) *Attorney, Agent, or Firm* — Hughes Socol Piers Resnick & Dym, Ltd (57) ABSTRACT

A contaminated solvent recycling system is disclosed and claimed. The system comprises a distillation vessel having an upper distillation zone and a separate, lower, waste collection zone. A heater heats contaminated solvent feed within the distillation zone to distill off the solvent. By separating the distillation zone from the waste collection zone, the distillation zone can process consecutive batches of contaminated solvent feed. The waste collection zone can accommodate waste accumulating from the distillation process for extended periods of time between waste removal operations.

4 Claims, 5 Drawing Sheets

(56) References Cited

U.S. PATENT DOCUMENTS

| | | | | |
|---|---|---|---|---|
| 4,830,710 A | * | 5/1989 | Thompson | 202/170 |
| 4,898,601 A | * | 2/1990 | Casey | 55/341.1 |
| 5,340,444 A | * | 8/1994 | van der Heijden | 202/186 |
| 5,980,695 A | * | 11/1999 | Cox et al. | 202/166 |
| 7,608,171 B2 | * | 10/2009 | Otukol | 203/10 |
| 2002/0036158 A1 | | 3/2002 | Austin | |
| 2002/0166759 A1 | * | 11/2002 | Mabry et al. | 203/6 |

* cited by examiner

CONTAMINATED SOLVENT RECYCLING SYSTEM

BACKGROUND OF THE INVENTION

Volatile solvents are used in many industrial processes in which the volatile solvent is used for cleaning purposes. As a result of such use the volatile solvent becomes contaminated with foreign matter. Such contamination may be in a variety of forms. For example, in an auto body shop, it would be in the form of paint residue from spray guns, which are normally cleaned with solvent in a gun washer. In an auto repair shop, the contaminants may well be oil and grease from the cleaning of mechanical parts. Due to the cost of such solvents, environmental concerns, and the cost of disposing of such contaminated volatile solvents, it is desirable to maximize the use that can be made of the solvent by removing the contamination from it by recycling it into the purified solvent form for further use in the industrial process. Various recycling systems exist for use in paint or body shops and as an example, reference is made to our published PCT application no. WO01/03810. In these systems, a batch of contaminated solvent is manually fed into a distiller and processed for use by the operator. When the recovered solvent from the batch is used up, the process is repeated. The contaminant in the form of a sludge is collected in a liner bag which is located in the distillation vessel and the bag is removed at the end of each batch for storage in a separate waste container until such time as the container is removed—typically by a recycling company which will visit the shop periodically and collect the sludge for disposal off-site.

The foregoing has a number of disadvantages. Firstly, the necessity for providing sufficient capacity to accommodate a relatively large quantity of sludge which can accumulate over the period of time between sludge removal operations, coupled with the necessity for providing sufficient recycled solvent from each batch for cleaning operations, translates to the need for a relatively large waste collection container and a relatively large distillation vessel, the combination of which is inefficient in terms of cost and space requirements. Furthermore, since the foregoing process requires that the distiller be run only periodically, this means that a relatively large mass of contaminated solvent must be heated to boiling each time, which is energy intensive, and a relatively large capacity cooling medium is required to condense the solvent vapour from the distillation. Also, operator intervention is inevitably involved to initiate and terminate the batchwise operations. The foregoing disadvantages are particularly pronounced in the case of small operations such as auto repair and paint shops.

SUMMARY OF THE INVENTION

It would therefore be desirable to provide a relatively inexpensive and energy efficient recycling system which could easily be placed in a service bay of an auto repair shop or similar type of establishment, as well as be adaptable for use in larger operations.

According to a first aspect of the invention, the need for removing sludge from the distillation vessel at the end of each batch is eliminated by confining the distillation zone to the top part of the distillation vessel by heating only the upper region of the vessel and providing a separate waste collection zone within the vessel. The sludge passes from the distillation zone to the waste collection zone where it accumulates, without impeding the efficiency of the heating medium. This maintains the efficiency of processing relatively small amounts of feed, whilst the overall size of the distillation vessel can be made as large as required to provide sufficient sludge capacity to accommodate sludge accumulating between periodic removal operations. If desired, for ease of handling, the waste collection zone and the distillation zone may be separate interconnected containers. In any case, the use of separate zones means that the frequency of manually removing the waste is greatly reduced, resulting in less service over a longer period of time.

According to a second aspect of the present invention, the contaminated solvent is processed automatically on a batch-wise basis by cycling between the heating and cooling phases without user intervention between consecutive cycles. During the heating phase, solvent is boiled off and exits the distillation vessel. During the cooling phase, solvent vapour re-condenses in the distillation vessel and this change of state creates a vacuum which sucks more contaminated solvent into the vessel, which is then cycled again through the heating and cooling phases. This enables the distillation vessel to be maintained between relatively narrow temperature limits as the distiller cycles between the boiling and cooling stages. Thus, the change of the vapour state in the distillation vessel functions as a pump in sucking contaminated solvent into the vessel. For maximum efficiency, the volume of contaminated solvent being processed in each cycle is small, which is feasible because there is a constant supply of usable recycled solvent being generated by successive cycles for use as required. This means that in many cases, a relatively low-power energy source—for example a standard 110 v supply—can be used.

The present invention can also be applied to the vaporization of process liquid such as water from a process liquid feed. According to this aspect of the invention, there is no need for separate distillation and waste collection zones, since no appreciable amount of waste would be generated. However, the distillation process would still rely upon the change of the vapour state in the distillation vessel upon cooling, which would function as a pump in sucking process liquid into the vessel.

DETAILED DESCRIPTION OF PREFERRED EMBODIMENTS

Figure 1:
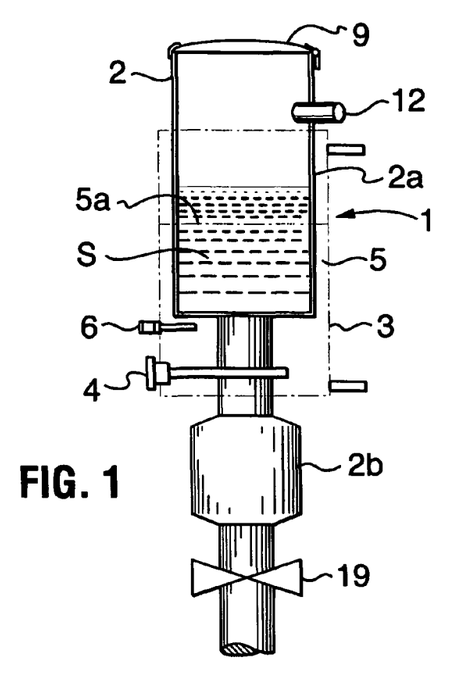
FIG. 1 is a schematic view of a distillation unit according to one embodiment of the invention.

FIG. 1 shows schematically a distillation unit [1] in accordance with one embodiment of the invention, comprising a distillation vessel [2] having its upper region located in a heating jacket [3], contaminated solvent or a mixture of solvents [S] to be recovered being heated in a distillation region [2a] of the distillation vessel [2] adjacent the heating jacket [3] to generate solvent vapour. This solvent vapour then exits through a conduit [12] wherein it is condensed.

The upper part [2a] of the distillation vessel [2] sits within the heating jacket [3] containing an oil bath [5]. The heating jacket [3] is provided with one or more heating elements [4] immersed in the oil and, in operation, each heating element

[4] heats the oil [5], which in turn heats the distillation zone formed in the upper part of the distillation vessel [2] at least until the solvent [S] within the distillation zone reaches its boiling point and vapour is generated. The distillation vessel [2] is provided with a hinged cover [9] for introduction of contaminated solvent to the distiller by the operator. When closed, the cover forms a seal with the distillation vessel to prevent the escape of any vapour other than through the conduit [12]. The conduit [12] is ideally positioned at the upper end of the distillation vessel [2] since the hot vapour will rise. The heating elements [4] are positioned at the bottom of the heating jacket for efficient heat transfer to the oil.

It is essential that the oil [5] have a boiling point higher than that of the solvent to be recovered or, in the case of a solvent mixture, the boiling point of the highest boiling component of the mixture. In addition, the oil [5] should not be flammable within the temperature ranges in which the distillation vessel [2] will operate. Preferably, the oil [5] in the heating vessel [3] will surround a substantial portion of the distillation region [2a] (for example, to the level [5a] in FIG. 1) to ensure that there is sufficient heat to maintain the evaporated solvent in the vapour phase at least as far as the conduit [12].

The distillation vessel [2] is provided with a lower part [2b] forming a waste collection zone for sludge from the distillation process and the lower part [2b] is provided with a drain tap [19] for removal of sludge.

In operation, the cover [9] is opened and contaminated solvent is introduced into the vessel. The cover is then closed and distillation commenced by energizing the heating elements [4] to heat the oil to a sufficient temperature to cause the solvent feed to boil, which then drive the solvent vapour out through the conduit [12]. Sludge forming as a result of the distillation falls into the collection zone [2b].

Since the sludge falls away from the distillation zone to the waste collection zone at the bottom of the distillation vessel, it is able to accumulate without impeding the efficiency of the heating medium. If the sludge were allowed to accumulate in the distillation zone, it would quickly impede the heat transfer efficiency, which is why the sludge must be removed on a regular basis (preferably after each batch has been distilled) when using a single-zone distillation vessel.

The size of the collection zone [2b] is selected in accordance with the desired frequency of sludge disposal and the type of sludge being removed. For example, if the sludge is from a parts cleaner, the sludge may be relatively light, since the contaminant will be oil, etc. However, in a paint shop operation, the sludge will be paint waste, which is much heavier. If, for example, the disposal is conducted on a monthly basis by a recycling company (as is typical in the industry), the collection zone [2b] may be quite small where the sludge is from a parts cleaner but quite large if it is from a paint shop operation, simply because the volume of paint waste from the latter will accumulate much more quickly. In summary, the division of the distillation vessel into a distillation zone and a sludge collection zone allows the distillation zone to be small enough to realize the efficiency of processing a relatively small amount of feed, whilst the overall size of the distillation vessel can be made as large as required to provide sufficient sludge capacity to accommodate sludge accumulating between periodic removal operations. If desired, instead of using a two-zone distillation vessel for both distillation and waste collection, a separate waste collection container may be provided beneath the distillation vessel, into which sludge passes from the distillation vessel. In any case, the frequency of manually removing the waste into a separate container for periodic disposal is reduced.

To provide automatic operation and control of the system, a temperature probe [6] senses the temperature of the oil bath and when it is at or below a first pre-programmed level which is just below the boiling point of the solvent, a suitable control means (not shown) is employed to energize the heating elements [4] and initiate the heating cycle. During the heating cycle, the heating elements raise the temperature of the solvent [S] to a second pre-programmed level which is just above the boiling point of the solvent and as the solvent vaporizes, the vapour passes out of the distillation vessel [2] into the conduit [12]. The probe has the added advantage that since overfilling of the sludge collection zone resulting in accumulation of sludge in the distillation zone causes slower heating of the solvent feed, this will be detected by the probe and an appropriate signal or command to shut down the distillation operation until the sludge has been removed can be generated.

It is also possible to adjust the power to the heating elements [4] in accordance with the temperature of the solvent in the manner described in our published PCT application no. WO01/03810 and using the control system described therein, which is incorporated herein by reference. This is especially desirable in the case where a mixture of solvents is to be recycled.

Figure 2:
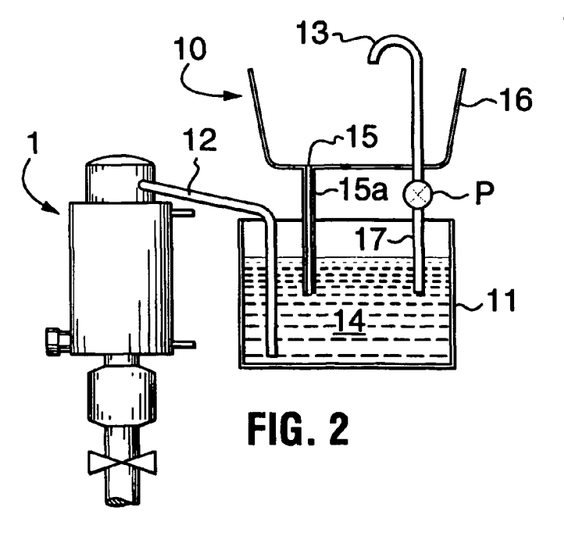
FIG. 2 is a schematic view of one embodiment of the contaminated solvent recycling system of the invention, as used in association with a parts washer.

A second embodiment of the invention is shown in FIG. 2. By way of example only, the system is shown in conjunction with a parts cleaner for use in an auto repair shop or the like for the purpose of cleaning mechanical parts which are contaminated with oil or grease. Of course, this is only one example of an environment in which the contaminated solvent recycling system may be used. As is conventionally found in such parts cleaners, there is provided a drum [11] containing solvent [14]. Extending downwardly into drum [11] is a conduit [17], the upper end of which communicates with the inlet of a pump [P]. The pump outlet communicates with a faucet or spray nozzle [13] for introducing solvent into a sink [16]. Contaminated solvent drains back into the drum [11] through a drain [15] and conduit [15a].

The distillation unit [1] is the same as is shown in FIG. 1, except there is no openable cover [9]. Instead, the distillation vessel [2] is closed to prevent the escape of any vapour generated therein other than through the conduit [12] and to maintain a vacuum within the vessel. In this embodiment, the conduit [12] extends beneath the surface of the solvent [14] within the drum [11], whereby the distillation vessel [2] and the solvent mass [14] form a closed system. The conduit [12] and the solvent [14] are below the boiling point of the solvent [S] and the vapour therefore condenses in the conduit (which may be provided with condenser coils in order to increase the condensation efficiency).

The distillation cycle is as described above. Again, to provide automatic operation and control of the system, a temperature probe [6] senses the temperature of the oil bath and when it is at or below a first pre-programmed level which is just below the boiling point of the solvent, a suitable control means (not shown) is employed to energize the heating elements [4] and initiate the heating cycle. During the heating cycle, the heating elements raise the temperature of the solvent [S] to a second pre-programmed level which is just above the boiling point of the solvent and as the solvent vaporizes, the vapour passes out of the distillation vessel [2] into the conduit [12]. After the temperature rises to the second pre-programmed level, the power supplied to the heating elements is shut off by the control means, which initiates the cooling cycle, with the result that any remaining vapours in the vessel [2] are allowed to cool and condense back into the liquid [S]. However, this embodiment of the invention makes use of the change of state of the vapour as it cools following the heating cycle. Because the system is closed, the condensation of the vapour within the distillation vessel [2] as it cools creates a vacuum which is used to draw solvent from the solvent mass [14] within the drum [11] through conduit [12] for recycling into the distillation vessel [2]. This acts as a natural pump and also allows a two-way flow through the conduit [12] of vapour away from vessel [2] and of contaminated solvent for recycling towards vessel [2], without the need for external pumps and separate inlet and outlet conduits, although external pumps and separate inlet and outlet conduits can also be employed, if desired, as will be explained hereinafter. Again, any waste which is not boiled off in the vessel [2] sinks down and is collected in the collection zone [2b] of the distillation vessel.

In both of the foregoing embodiments, the collection zone [2b] of the distillation vessel may be replaced by a waste collection container [9] which is located below and in communication with the distillation vessel [2]. The waste collection container [9] may be removable for cleaning or disposal or may be fitted with a drain tap or valve [19] for periodic removal of the collected waste. The conventional arrangement for collection and disposal of solid wastes accumulated in the distillation vessel is a porous bag which lines the distillation vessel and which is removed and replaced periodically. Whilst such an arrangement can be used with the system of this invention, the provision of a waste collection zone which is separate from the distillation zone is advantageous over the bag because it allows the waste to be removed without the necessity for opening the distillation vessel and replacing the bag, which is especially significant in a closed system which relies upon the change of the vapour state in the distillation vessel to function as a pump in sucking contaminated solvent into the vessel. Also envisaged is a removable waste collection cartridge, which can be attached to the lower part of the distillation vessel (for example, using a spin-on cartridge in similar fashion to an automotive oil filter) and which can be removed from the distillation vessel and replaced by a fresh cartridge. As discussed above, a major advantage of using a separate waste collection container is that it may be any size required to accommodate the sludge build-up between periodic disposal operations. For example, the distillation vessel could be small (say, 1 liter capacity) in order to provide the desired operating efficiencies, whilst the waste collection region or container could be large (say, 20 liters). This enables the customer to always have clean solvent available from the recycler, whilst the intervals between removal of the sludge are dictated solely by the size of the waste collection container. The container may itself be disposable. One such possibility would be to use the drum in which the solvent is originally delivered to the customer. Such drums are typically provided with a cover which is sealingly attached to the drum to prevent escape of solvent vapours during shipping and storage. The distillation vessel could be provided with a fitting which would simulate the conventional cover in its attachment to the drum and the drum would then be secured to the fitting and left in place to collect sludge from the vessel. To dispose of the accumulated sludge, it is necessary only to remove the drum and replace it with a fresh one—possibly the drum in which fresh solvent is delivered to the customer.

Figure 3:
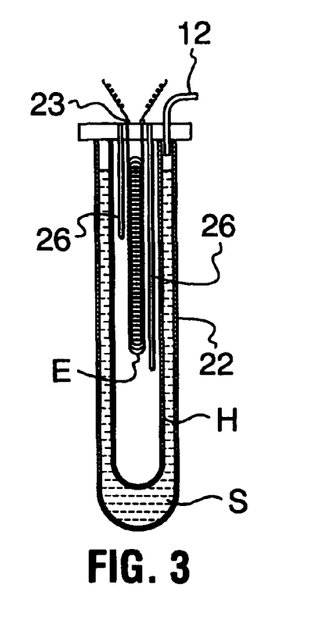
FIG. 3 is a schematic sectional view of a distillation unit according to a further embodiment of the invention.

While the foregoing embodiments use indirect heating by means of an oil bath, alternative means of heating the distillation vessel [2] are possible. An especially preferred alternative is illustrated in FIG. 3, wherein the distillation vessel [22] does not reside inside an oil bath but, instead, is provided with an immersion heater [H] having an electric heating element [E] located therein. Power to the heating element [E] is via connectors [23] and a pair of temperature probes [26] extends adjacent the surface of the heater and supplies signals to the control means (not shown) for the heating element. The temperature probes [26] sense the temperature of the heater and, as in the previous embodiments, when it is at or below a first pre-programmed level which is just below the boiling point of the solvent, the control means is employed to energize the heating element [E] and initiate the heating cycle in similar fashion to that described above.

The use of an internal heater as opposed to an oil bath is advantageous for a number of reasons. The heat transfer from the heating element to the solvent is more direct than the heat transfer through an oil bath, which means that the temperature of the heater can be controlled to from just below to just above the boiling point of the solvent, which in turn means that the heater never has to be raised to a temperature approaching the auto-ignition temperature of the solvent in order to compensate for inefficiency in the heat transfer. Therefore it is inherently safer. The heat transfer is also much faster, since there is no oil medium to be heated or cooled, which translates to less energy loss and the ability to conduct more distillation and recovery cycles in a given amount of time. The vessel [22] can be in a number of different forms, depending upon the requirements of the user—all of which permit the ready disposal of the sludge. The vessel can be in the form of a screw-on cartridge which collects the sludge in the bottom and can easily be unscrewed for either disposal and replacement by a new cartridge or emptying out of the sludge and re-use of the cartridge. This is particularly feasible where the sludge build-up is relatively slow (as in the case of a parts cleaner, for example, where in the sludge is essentially oil residues). Alternatively, the vessel [22] can be in the form of a standard solvent drum as described above, into which the heater can be immersed and which can be removed when the sludge build-up is sufficiently great and replaced by a new drum. This is desirable where the sludge build-up is relatively fast (as in the case of a paint shop operation, for example, where in the sludge is essentially paint residue). In this case, the conventional cover of the drum could be replaced by a fitting which would simulate the conventional cover in its attachment to the drum but which would have an orifice through which the heater [H] could be passed and immersed in the drum and means for removably securing the heater to the fitting. To dispose of the accumulated sludge, it is necessary only to remove the drum and replace it with a fresh one—possibly the drum in which fresh solvent is delivered to the customer.

Figure 4:
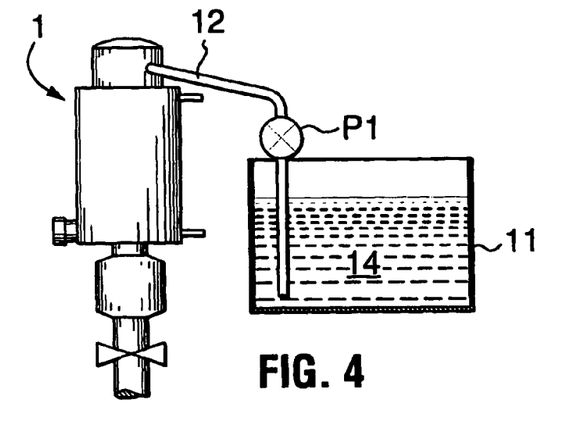
FIGS. 4-8 are schematic views of further embodiments of the contaminated solvent recycling system.

In the alternative embodiment shown in FIG. 4, a vacuum pump P1 is provided either in the conduit [12], the purpose of which is to further lower and control the pressure within the distillation vessel and hence the boiling point of the liquid within the distillation vessel during the heating cycle. This enables the heating means to operate at a temperature which is further below the auto-ignition temperature of the solvent than would otherwise be the case, which may be a significant advantage in terms of safety when processing solvents wherein the boiling point at atmospheric pressure is close to the auto-ignition temperature. The pump [P1] must not impede passage of contaminated solvent into the distillation vessel.

Figure 5:
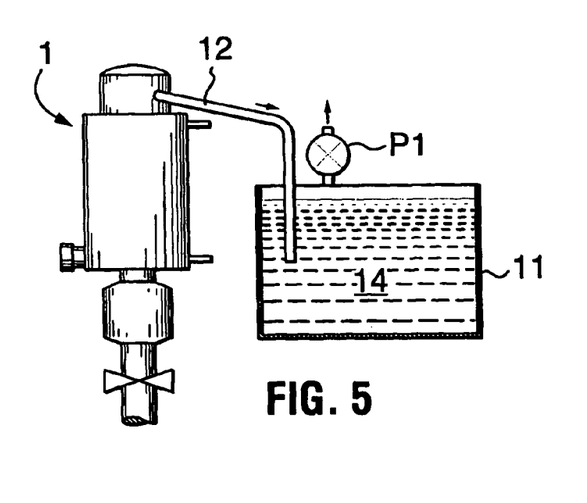

The embodiment of FIG. 5 is similar to FIG. 4, except that the drum [11] is closed and the pump [P1] is located in communication with the interior of the drum but outside the conduit [12]. This has the advantage of applying vacuum above the solvent mass [14] and thus not interfering with the liquid or vapour flow in the conduit.

Figure 6A:
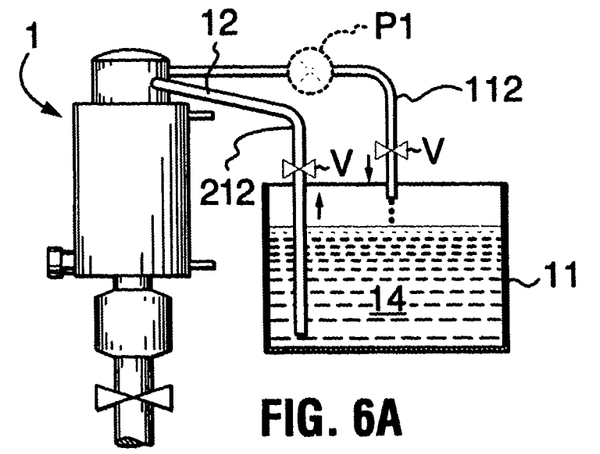
Figure 6B:
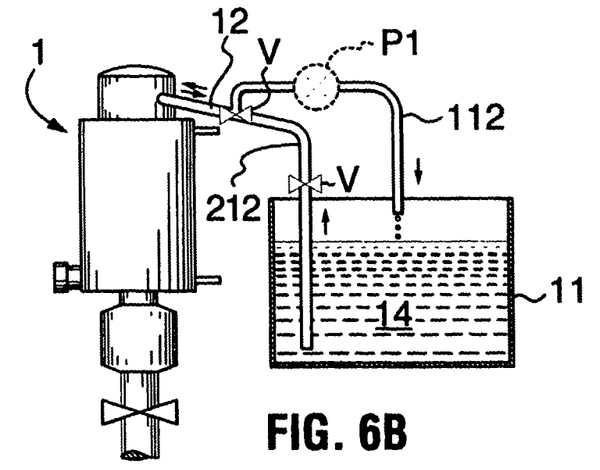

In the embodiment shown in FIG. 6A, conduit [12] is separated into feed conduit [212] and outlet conduit [112]. In this case, a means for ensuring one-way passage of vapour and contaminated solvent feed must be provided. Such means may take the form of one-way valves [V] which permit passage of solvent feed only from the drum [11] towards the distillation vessel and permit passage of solvent vapour only from the distillation vessel towards the drum [11]. Again, a pump P1 may be utilized in outlet conduit [112] to lower and control the pressure within the distillation vessel. FIG. 6B shows an alternative arrangement wherein the single conduit [12] branches into outlet conduit [112] and feed conduit [212]. In this arrangement, a three-way valve [V] is placed at the junction between conduits [12], [112] and [212]. When the distiller is in the heating cycle, the valve closes the conduit [212] and opens conduit [112]. When the distiller goes into the cool-down cycle, the valve closes conduit [112] and opens conduit [212]. Switching of the valve is synchronized by the controller with the activation and deactivation of the heating elements in the distillation unit.

Figure 7:
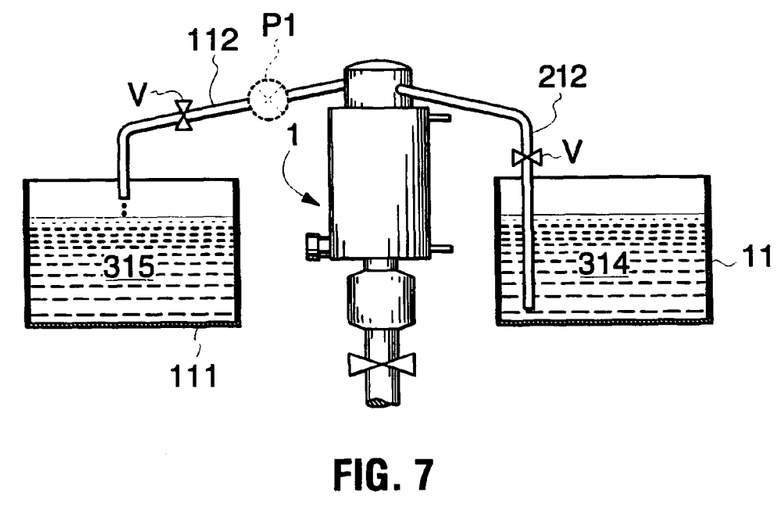

If desired, outlet conduit [112] may be led into a clean solvent collection drum [111] which is separate from contaminated solvent drum [11], as shown in FIG. 7. Contaminated solvent [314] passes from the drum [11] to the distiller [1] through feed conduit [212]. Solvent passes from the distiller into outlet conduit [112] and condensate [315] is collected in the clean solvent collection drum [111]. The embodiment of FIG. 7 is especially advantageous where an increased purity level for the recovered solvent is required, since the recovered solvent is not recycled back into the contaminated solvent, as in the foregoing embodiments. Again, one-way valves [V] are provided in the conduits [112] and [212] for the same purpose as in FIG. 6A. Alternatively, a single conduit branching into the outlet conduit and the feed conduit may be employed as in FIG. 6B, with a three-way valve placed at the junction between the three conduits.

Figure 8:
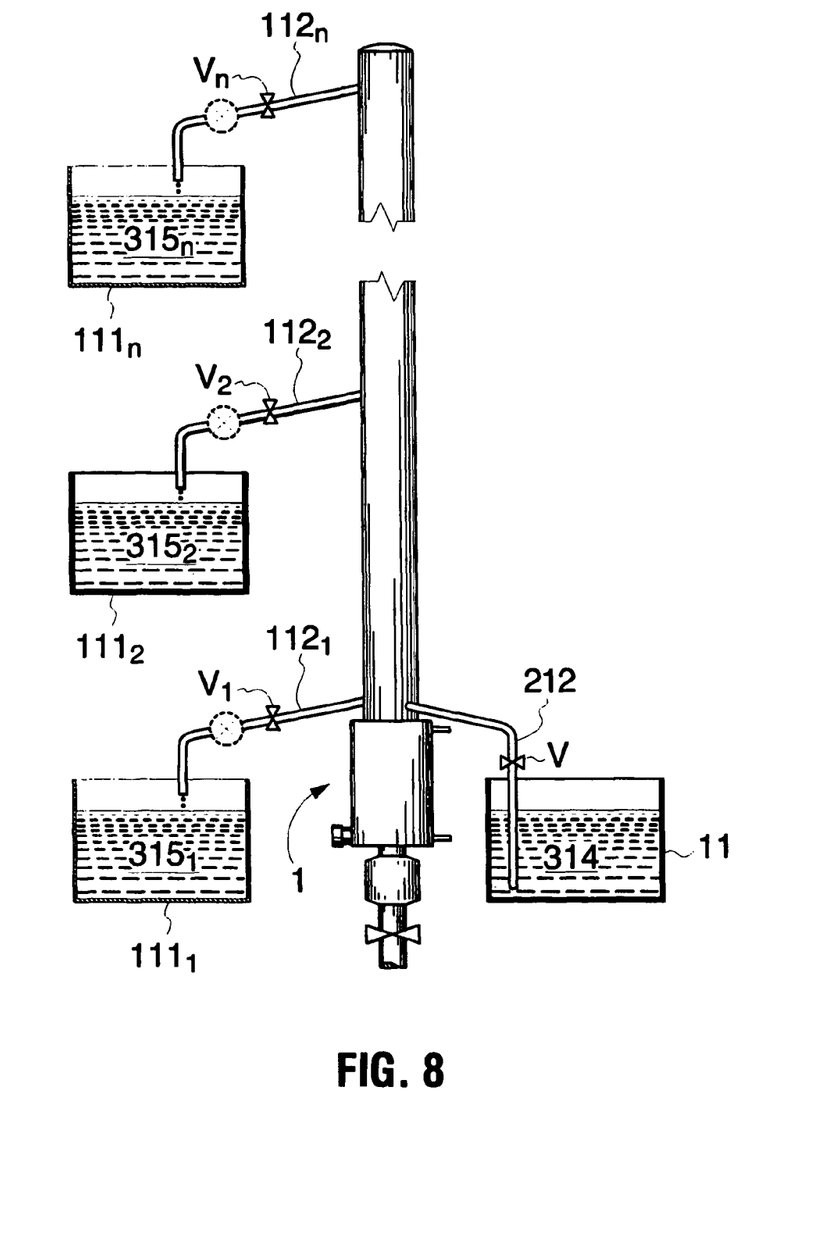

FIG. 8 illustrates yet a further embodiment wherein a plurality of outlet conduits [$121_{1-n}$] are provided. This is particularly useful where the contaminated solvent feed has "n" solvent fractions which are desired to be collected separately. Thus, each conduit [$112_{1-n}$] would feed condensate to a respective one of n collection containers [$111_{1-n}$]. The outlet conduits are provided with valves [$V_{1-n}$] respectively and optionally with pumps [P1]. The feed conduit [212] is provided with a one-way valve [V], as in the embodiments of FIGS. 6 and 7. The heating cycle is commenced by heating the distillation vessel to a temperature sufficient to boil the lowest fraction. At that time, all valves [$V_{1-n}$] are closed, with the exception of [$V_1$]. Condensed solvent [$315_1$] from this fraction is collected in solvent collection drum [$111_1$]. When vaporisation of the lowest fraction is complete, the temperature is raised to boil the next fraction and, at the same time, valve [$V_1$] is closed and valve [$V_2$] in conduit [$112_2$] is opened, thus allowing the next solvent fraction [$315_2$] to be collected in drum [$111_2$]. The process is continued for each of the solvent fractions up to the $n^{th}$ fraction, after which the system enters the cool-down phase to draw fresh contaminated solvent feed into the distillation vessel, whereupon the fractions are again distilled off in sequence.

In each of the embodiments of FIGS. 6-8, the clean solvent collection drum [11] or [111] may be closed and the pump [P1] located in communication with the interior of the drum but outside the outlet conduit from the distillation vessel. Again, this has the advantage of applying vacuum above the solvent mass and thus drawing more vapour through the solvent mass with consequent increase in solvent recovery within the mass.

In each of the foregoing embodiments wherein the return conduit is separate from the feed conduit, the outlet conduit need not terminate beneath the surface of the solvent but can terminate above the surface to allow condensate to drip from the conduit into the solvent below. However, as noted above, there is some advantage to having the conduit terminate below the surface of the solvent, which is that the solvent mass condenses any solvent vapour exiting the outlet conduit.

Also as noted above, the system according to the invention is especially advantageous from the standpoint of simplicity and compactness, which makes it particularly suitable for such applications as auto repair shops. However, whilst the system has been described in the context of solvent recycling to remove waste, the "waste" can actually be valuable product which it is desired to recover. As an example, may be mentioned silver residue from a photographic film making process.

While only specific embodiments of the invention have been described, it is apparent that various additions and modifications can be made thereto, and various alternatives can be selected. It is, therefore, the intention in the appended claims to cover all such additions, modifications and alternatives as may fall within the true scope of the invention.

The invention claimed is:
1. A contaminated solvent distillation system comprising:
    a distillation means comprising a distillation vessel for heating and vaporizing said solvent within said vessel;
    a drum for receiving and holding contaminated solvent; and
    a conduit extending between and communicating with said distillation vessel and said drum;
    said distillation vessel, said conduit and said drum forming a closed system wherein said conduit comprises
    a first conduit extending between and communicating with said distillation vessel and said drum, and
    a second one-way conduit for conveying solvent vapor away from said distillation vessel;
    whereby heating solvent in said distillation vessel causes the solvent to vaporize and causes vapor to exit through said second conduit;
    and subsequent cooling means for cooling of said distillation vessel to cause said vapor within said distillation vessel to condense and create a vacuum which draws solvent through said first conduit into said distillation vessel; and
    valve means located in said first and second conduit to permit unidirectional passage of contaminated solvent from said drum into said distillation vessel and to permit unidirectional passage of solvent vapor from said distillation vessel, wherein said valve means comprises a one-way valve located in each of said first and second conduits.
2. A contaminated solvent distillation system comprising:
    a distillation means comprising a distillation vessel for heating contaminated solvent and vaporizing said solvent within said vessel;
    a drum for receiving and holding solvent; and
    a conduit extending between and communicating with said distillation vessel and said drum;
    said distillation vessel, said conduit and said drum forming a closed system wherein said conduit comprises:
    a first conduit extending between and communicating with said distillation vessel and said drum, and
    a second one-way conduit for conveying solvent vapor away from said distillation vessel;
    whereby heating solvent in said distillation vessel causes the solvent to vaporize and causes vapor to exit through said second conduit;
    and subsequent cooling means for cooling of vapor in said distillation vessel to cause said vapor within said distillation vessel to condense and create a vacuum which draws solvent through said first conduit into said distillation vessel; and valve means located in said first and second conduits for permitting unidirectional passage of contaminated solvent from said drum into said distillation vessel and to permit unidirectional passage of solvent vapor from said distillation vessel, wherein said valve means comprises a two-way valve located in each of said first and second conduits, said two-way valves being operative to selectively cause at least said first conduit to communicate with said distillation vessel.

3. A contaminated solvent distillation system comprising:
   a distillation means comprising a distillation vessel for heating contaminated solvent and vaporizing said solvent within said vessel;
   a drum for receiving and holding solvent; and
   a conduit extending between and communicating with said distillation vessel and said drum;

said distillation vessel, said conduit and said drum forming a closed system wherein said conduit comprises:
   a first conduit extending between and communicating with said distillation vessel and said drum, and
   a second one-way conduit for conveying solvent vapor away from said distillation vessel;

whereby heating of solvent in said distillation vessel causes the solvent to vaporize and causes the vapor to exit through said second conduit;

and subsequent means for cooling of vapor in said distillation vessel causes said vapor within said distillation vessel to condense and create a vacuum which draws solvent through said first conduit into said distillation vessel; and valve means located in said first and second conduits to permit unidirectional passage of contaminated solvent from said drum into said distillation vessel and to permit unidirectional passage of solvent vapor from said distillation vessel, wherein said first and second conduits are branches of a common conduit communicating with said distillation vessel, said system further including a selector valve located at a junction between said common conduit and said first and second conduits and wherein said selector valve is operative to selectively connect said second conduit with said common conduit during heating of said distillation vessel, and said valve is operative to selectively connect said first conduit with said common conduit during cooling of said distillation vessel.

4. A contaminated solvent distillation and recycling system comprising:
   a distillation means comprising a distillation vessel and heating means for distilling and heating contaminated solvent within said vessel;
   a drum for receiving and holding solvent; and
   a conduit extending between and communicating with said distillation vessel and said drum;

a first conduit extending between and communicating with said distillation vessel and said drum, and a second one-way conduit for conveying solvent vapor away from vessel;

said distillation vessel and said conduits forming a closed system, whereby heating solvent in said distillation vessel causes the solvent to vaporize and causes vapor to exit through said second conduit;

and subsequent cooling of vapor in said distillation vessel causes said vapor within said distillation vessel to condense and create a vacuum which draws solvent through said first conduit into said distillation vessel; and valve means located in said first and second conduits to permit unidirectional passage of contaminated solvent from said drum into said distillation vessel and to permit unidirectional passage of solvent vapor from said distillation vessel, the solvent recycling system further comprising vacuum pump in communication with said distillation vessel, for controlling the internal pressure of said vessel during distillation of said solvent, wherein said vacuum pump is located in said second conduit.

\* \* \* \* \*